United States Patent [19]

Kunz

[11] Patent Number: 4,951,711

[45] Date of Patent: Aug. 28, 1990

[54] MULTIWAY COCK

[75] Inventor: Peter Kunz, Schaffhausen, Switzerland

[73] Assignee: Georg Fischer Aktiengesellschaft, Schaffhausen, Switzerland

[21] Appl. No.: 637,898

[22] Filed: Aug. 6, 1984

[30] Foreign Application Priority Data

Aug. 9, 1983 [CH] Switzerland .......................... 4315/83

[51] Int. Cl.⁵ .................... F16K 11/087; F16K 31/20; F16K 31/60
[52] U.S. Cl. ................. 137/625.47; 251/290; 251/309
[58] Field of Search ............... 251/290, 310; 137/269, 137/270, 271, 625.47, 876, 887

[56] References Cited

U.S. PATENT DOCUMENTS

| 631,699 | 8/1899 | Darragh et al. | 137/269 |
| 1,721,884 | 7/1929 | Robertson | 137/876 |
| 2,630,018 | 3/1953 | Hannant | 251/290 |
| 4,203,461 | 5/1980 | Schwitters | 251/290 |
| 4,232,709 | 11/1980 | Zoric | 137/625.47 |

Primary Examiner—Martin P. Schwadron
Attorney, Agent, or Firm—Toren, McGeady & Associates

[57] ABSTRACT

A multiway cock has a housing with three separate pipe connections disposed in a T-shaped arrangement. A spherical cock plug is located within the housing. Two bearing bosses are provided on the housing offset by 90° relative to one another for providing two different mounting locations for an operating element which selectively positions the cock plug. Different arrangements of the multiway cock can be provided by selectively locating an operating element in one of the bearing bosses while using the same parts for the cock.

4 Claims, 1 Drawing Sheet

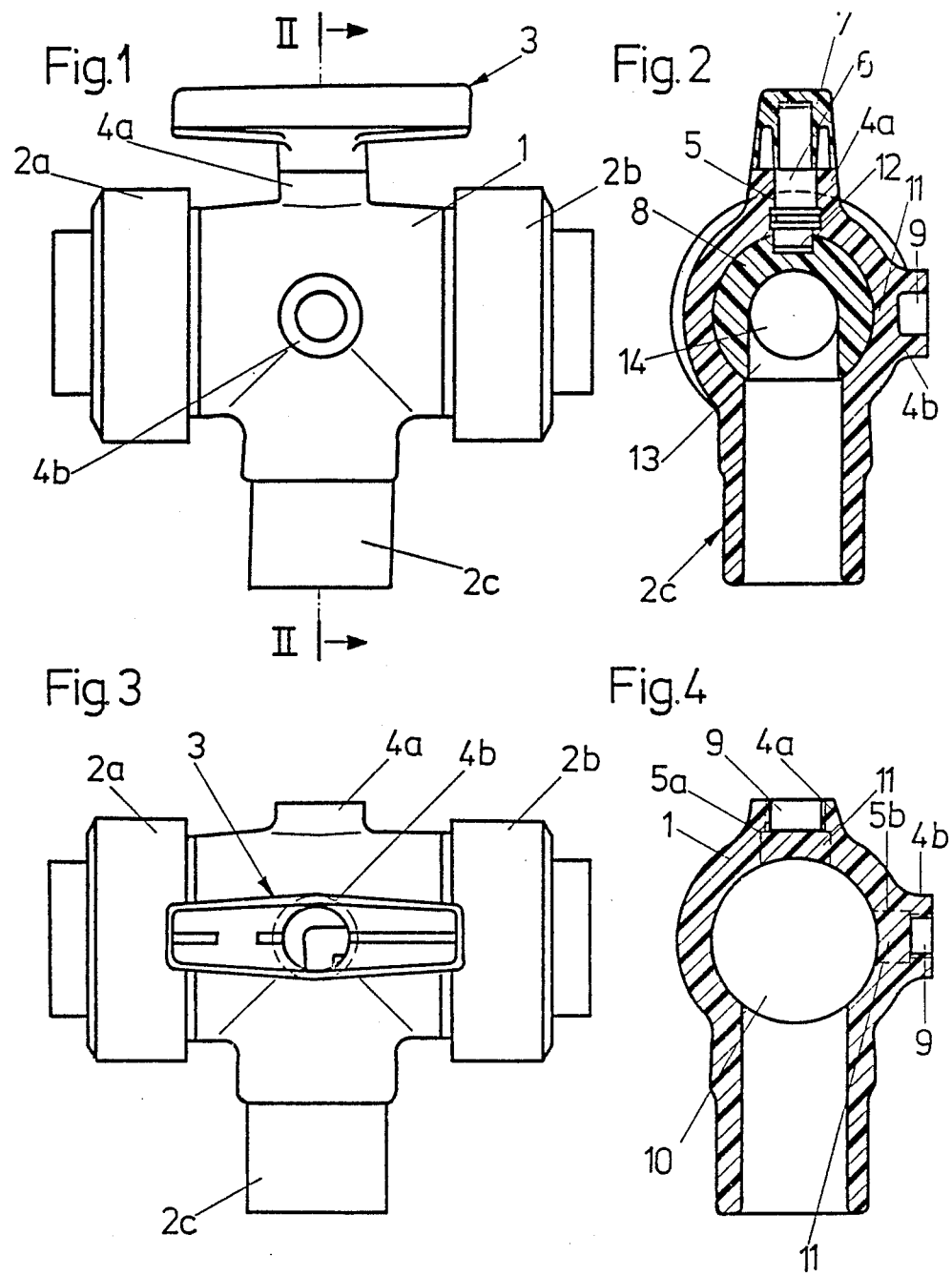

MULTIWAY COCK

SUMMARY OF THE INVENTION

The present invention is directed to a multiway cock including a housing with three pipe connections located in the housing in a T-shaped arrangement. A spherical cock plug is positioned in the housing and an operating element is connected to the plug for selectively positioning it in the housing.

Multiway cocks with three pipe connections disposed in a T-shaped arrangement must be constructed in different ways when the lines connected to it extend in different directions. For instance, if a cock is installed in a horizontally extending pipe line with a third pipe line extending vertically downward into connection with the cock, it may be necessary that the operating element, usually a handle, is operable from the front or from the top so that in each case a differently constructed multiway cock is needed. Where the operating element must be located in different positions with respect to the arrangement of the pipe connections, in the known cocks it has been necessary to provide different housings which involve higher costs for the housing molds manufactured by injection molding and a complicated storage of the different parts which make up the multiway cock.

Therefore, the primary object of the present invention is to provide multiway cocks of the above-mentioned type which can be constructed of the same shaped parts and can be used in different arrangements of the pipes to be connected which require different arrangements of the operating element.

In accordance with the present invention, at least two bearing bosses are formed in angularly offset relation in the housing so that the operating element can be connected to the cock plug in different positions in accordance with the required pipe connections on the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of a multiway cock with a first position of the operating element;

FIG. 2 is a sectional view taken along the line II—II in FIG. 1;

FIG. 3 is an elevational view similar to FIG. 1, however, illustrating a second position of the operating element; and FIG. 4 is a cross-sectional view similar to FIG. 2, however, only illustrating the housing with the two possible positions of the operating element.

In FIGS. 1 and 2 a three-way ball cock is displayed with three pipe connections 2a, 2b, 2c disposed in a T-shaped arrangement in a cock housing 1.

As viewed in FIG. 1 the pipe connections 2a and 2b are in axial alignment with the pipe connection 2c extending approximately perpendicularly of the axial alignment of the other two pipe connections Diametrically opposite the pipe connection 2c there is an operating element 3 in the form of a manually operable handle and it is mounted in a bearing boss 4a formed as a part of the housing 1. Operating element 3 includes a shaft 6 rotatably supported in bore 5 of the bearing boss 4a. Within the housing 1, the end of the shaft 6 is secured to a spherical cock plug 8 so that as the shaft is rotated the spherical cock plug 8 is selectively positioned within the housing. The outer end of the shaft 6 is connected to a handle 7. By turning the handle 7 the cock plug 8 can be selectively positioned within the housing 1 for the desired flow between the pipe connections.

A second bearing boss 4b is located in the housing 1 in the same cross-sectional plane with the bearing boss 4a but offset by 90° with respect to the other bearing boss. As can be seen in FIG. 2, the bearing boss 4a in which the operating element 3 is mounted extends generally vertically while the bearing boss 4b extends generally horizontally. With this arrangement of the bearing bosses 4a, 4b a second variation of the multiway cock using the same parts can be established as is shown in FIG. 3. In FIG. 3 the operating element 3 is displaced by 90° from the position shown in FIG. 1. As can be seen in FIG. 2, the bearing boss 4a is in general axial alignment with the pipe connection 2c, while the bearing boss 4b is angularly displaced by 90° relative to the bearing boss 4a and the pipe connection 2c.

In FIG. 4 a cross-section is shown only through the housing 1. It is evident from FIG. 4 that the housing, designed as a shaped part, has two bearing bosses 4a and 4b formed on it and disposed in angularly spaced relation Each bearing boss 4a, 4b has a recess 9 extending inwardly from the outside surface of the housing. As originally formed, the location of each bearing boss 4a, 4b has a wall 11 forming a closure between the base of the recess 9 and the inner space 10 within the housing in which the plug cock 8 is positioned. Before the assembly of the multiway cock, one of the bores 5a or 5b is formed inwardly from the base of the recess 9 into the inner space 10. The particular bore 5a or 5b is determined by the required location of the operating element 3 on the housing, corresponding to either FIG. 1 or FIG. 3.

Preferably, the housing is formed of a plastics material, such as polyvinyl chloride, and is produced by injection molding with the bores 5a, 5b being formed by a mechanical operation.

Further, the spherical cock plug 8 is also produced from a plastics material in an injection molding operation. The cock plug 8 is formed with a recess 12, note FIG. 2, for receiving the flattened surfaces on the shaft 6, and a blind hole 13.

Before the assembly of the parts of the multiway cock, depending on the arrangement of the operating element and the flow passages for the medium through the cock plug 8, bores 14 are formed which extend transversely of the blind hole 13 so that the combination of the blind hole 13 and the bores 14 form the flow channels for the medium Accordingly, though different arrangements of the flow channel may be required, it is not necessary to provide more than one embodiment of the shaped parts or more than one injection mold.

Due to the described construction of the housing 1 with two bearing bosses 4a, 4b, and the spherical cock plug 8 as a shaped part with the possibility of subsequently drilling the flow channel in the direction required for a particular arrangement of the pipe connections 2a, 2b, 2c, different variations of the multiway cock can be assembled using the same parts or shaped parts whereby the costs for molds for the injection molded part can be limited and the storage facilities for the parts can be significantly reduced.

While specific embodiments of the invention have been shown and described in detail to illustrate the application of the inventive principles, it will be understood that the invention may be embodied otherwise without departing from such principles.

I claim:

1. A multiway cock comprising a housing having an inside surface and an outside surface, three pipe connections located in said housing in a T-shaped arrangement extending between the inside surface and the outside surface, a spherical cock plug positioned within the inside surface of said housing, an operating element mounted on the outside surface of said housing and connected to said cock plug for selectively positioning said cock plug, wherein the improvement comprises that said housing is a monolithic member, at least two separate bearing bosses each formed on the outside surface of said housing monolithically with said housing in angularly spaced relation and each said bearing boss, aligned with said cock plug, is arranged to receive said operating element for supporting said operating element at a different angularly spaced position on said housing so that said operating element engages said cock plug, two of said pipe connections are arranged in axial alignment and a third pipe connection has an axis extending transversely of the axis of the other two pipe connections forming the T-shaped arrangement, one said bearing boss is aligned opposite said third pipe connection and the other said bearing boss is offset by 90° on said housing from the axis of said one bearing boss and has an axis extending perpendicularly to the axial alignment of the two of said pipe connections, each said bearing boss on said housing comprises a recess extending inwardly from the outside surface of said housing and having a base spaced outwardly from the inside surface of said housing and a wall extending from the base of said recess to the inside of said housing and forming a seal between the inside of said housing and the outside of said housing and in the completed assembly of said multiway cock a bore is formed through said wall from the base of said recess to the inside surface of said housing forming a continuous bore for supporting said operating element.

2. A multiway cock, as set forth in claim 1, wherein said operating element includes a handle located on the out surface of said housing and a shaft extending from said handle through said bore in said bearing boss into the inside of said housing where said shaft is secured to said cock plug.

3. A multiway cock, as set forth in claim 1 wherein said housing is formed of a plastics material and is produced in an injection molding operation.

4. A multiway cock, as set forth in claim 2, wherein said spherical cock plug is initially formed with a plug recess for receiving said operating element and a blind borehole spaced angularly from said plug recess, and a bore is formed in said cock plug in connection with said blind bore when the desired pipe connections of said multiway cock are determined.

* * * * *